(No Model.)
I. W. BLAKE & M. V. HULL.
BOWL HOLDER.
No. 600,506. Patented Mar. 15, 1898.
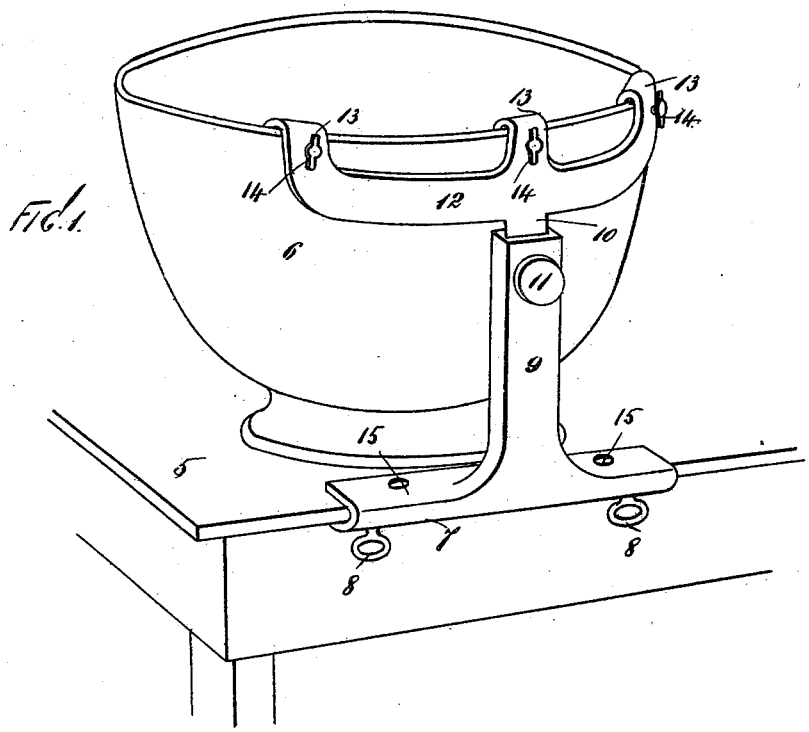
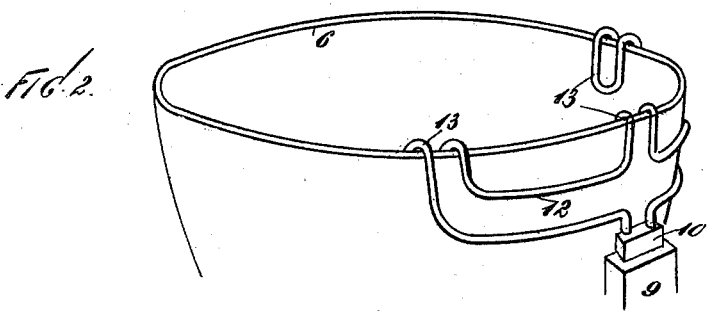
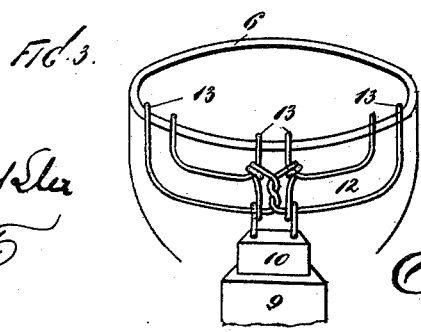

UNITED STATES PATENT OFFICE.

ISABEL WHITNEY BLAKE AND MATTIE VIRGINIA HULL, OF WEST HAVEN, CONNECTICUT.

BOWL-HOLDER.

SPECIFICATION forming part of Letters Patent No. 600,506, dated March 15, 1898.

Application filed April 23, 1897. Serial No. 633,450. (No model.)

*To all whom it may concern:*

Be it known that we, ISABEL WHITNEY BLAKE and MATTIE VIRGINIA HULL, citizens of the United States, residing at West Haven, in the county of New Haven and State of Connecticut, have invented certain new and useful Improvements in Bowl-Holders, of which the following is a full and complete specification, such as will enable those skilled in the art to which it appertains to make and use the same.

This invention relates to bowl-holders; and the object thereof is to provide an improved device of this class for holding a bowl or other vessel on a table or other support, a further object being to provide an improved device for holding mortar-bowls such as are employed by druggists, washbowls, bread-bowls, and other and similar vessels on a table or other support while said vessels are in use.

The invention is fully disclosed in the following specification, of which the accompanying drawings form a part, in which—

Figure 1 is a perspective view of our improved bowl-holder and showing the method of its operation, and Figs. 2 and 3 similar views showing modified forms of construction.

In the drawings forming part of this specification the separate parts of our improvement are designated by the same numerals of reference in each of the views, and in said drawings, reference being made to Fig. 1, we have shown at 5 a table or other support, which may be of any desired form and construction, and at 6 an ordinary bowl.

In the practice of our invention we provide a holder for the bowl 6, which, reference being made to Fig. 1, consists of an oblong clamp 7, which is adapted to be connected with the edge of a table by means of set-screws 8 or in any desired manner, and said clamp is provided with a vertical standard 9, in which is mounted a vertically-movable bar 10, which is adapted to be adjusted in the standard 9 by means of a set-screw 11.

The bar 10 is provided at its upper end with a cross-head 12, which is provided with a plurality of hooks 13, three of which are shown, and which are adapted to overlap or engage with the perimeter or upper edge of the bowl 6, and by means of this device the said bowl may be securely held on the table or support, as will be readily understood.

Our invention is not limited to the form of the cross-head 12, which is connected with the vertically-adjustable bar 10, and any suitable device for this purpose may be employed, and in Fig. 2 we have shown a modified form of construction in which the cross-head is composed of spring-wire bent to form the hooks 13 and also the cross-head 12, and in Fig. 3 we have shown another modification, in which the cross-head 12 and the hooks 13, connected therewith, are also composed of wire, and any suitable attachment for the upper end of the adjustable bar 10 which is designed to grasp and securely hold the upper edge of the bowl will answer the purpose and come within the scope of our invention. We also prefer to provide the hooks 13, or the outsides thereof, with set-screws 14, which are intended to more securely clamp and hold the side of the bowl, this construction being shown in Fig. 1, and we also form in the top of the oblong clamp 7 screw-holes 15, through which set-screws may be inserted similar to those shown at 8; but these features of construction are not absolutely essential and may or may not be employed.

This device is simple in construction and operation and is perfectly adapted to accomplish the result for which it is intended, and it will be apparent that changes in and modifications of the construction of the clamp 7, by which the holder is connected with the table or other support, may be made without departing from the spirit of our invention or sacrificing its advantages.

Having fully described our invention, we claim as new and desire to secure by Letters Patent—

1. An improved bowl-holder, comprising a longitudinally-extended cross-head segmentally curved in its longitudinal plane and provided with a series of fingers or hooks at different points throughout its length, whereby the extended cross-head operates with relation to an extended portion of the periphery of a bowl and the hooks engage said portion of the periphery at different points, a standard carrying said extended cross-head and provided with a clamping-base extended transversely so that it projects at each side the standard, said base being adapted to be secured to the edge of a table or support and the relative arrangement being such that the extended cross-head projects transversely with respect to the standard, and some distance at each side the latter, substantially as and for the purpose set forth.

2. The herein-described bowl-holder comprising a clamp 7 having set-screws 8, a standard 9, having a set-screw 11, a movable bar 10, mounted in said standard, and provided with segmental cross-head 12, having a plurality of hooks 13, and set-screws 14 secured in each of said hooks 13 and adapted to engage the rim of the bowl, substantially as and for the purpose described.

3. A bowl-holder comprising a clamp adapted to be secured to a support, a segmental cross-head connected therewith and vertically adjustable thereto, whereby it is adaptable in height to bowls of varying sizes, said segmental cross-head being of a length sufficient to parallel a substantial portion of the periphery of a bowl, extensions or hooks at intermediate points upon said segmental cross-head adapted to engage the edge of the bowl at such points, and set-screws secured upon the outside of each of the hooks whereby the frictional engagement of said hooks with the upper edge of the bowl is caused to accommodate itself to the varying segments of the peripheries of the different-sized bowls according to the width thereof, substantially as shown and described.

4. A bowl-holder comprising a clamp adapted to be secured to a support, a segmental cross-head connected therewith and vertically adjustable thereto, whereby it is adaptable in height to bowls of varying sizes, said segmental cross-head being of a length sufficient to parallel a substantial portion of the periphery of a bowl, extensions or hooks at intermediate points upon said segmental cross-head adapted to engage the edge of the bowl at such points, and the said cross-head and extensions being formed and adapted to accommodate the frictional engagement of the hooks to the varying segments of the periphery of the different-sized bowls according to the width thereof, substantially as shown and described.

In testimony that we claim the foregoing as our invention we have signed our names, in presence of the subscribing witnesses, this 20th day of April, 1897.

ISABEL WHITNEY BLAKE.
MATTIE VIRGINIA HULL.

Witnesses:
WILLIAM S. PARDEE,
ALLYN B. WILMOT.